April 26, 1938. R. VON GRUBER-REHENBURG ET AL 2,115,630
PROCESS AND APPARATUS FOR TREATING LENGTHS OF MATERIAL
Filed Nov. 13, 1935
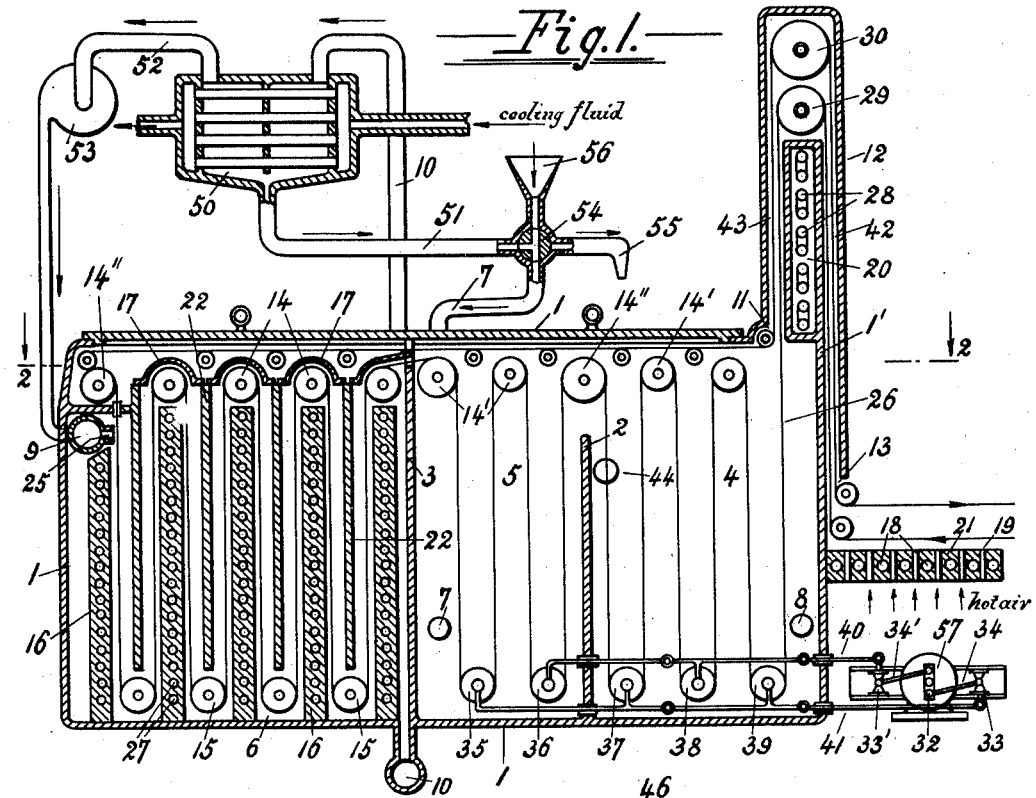
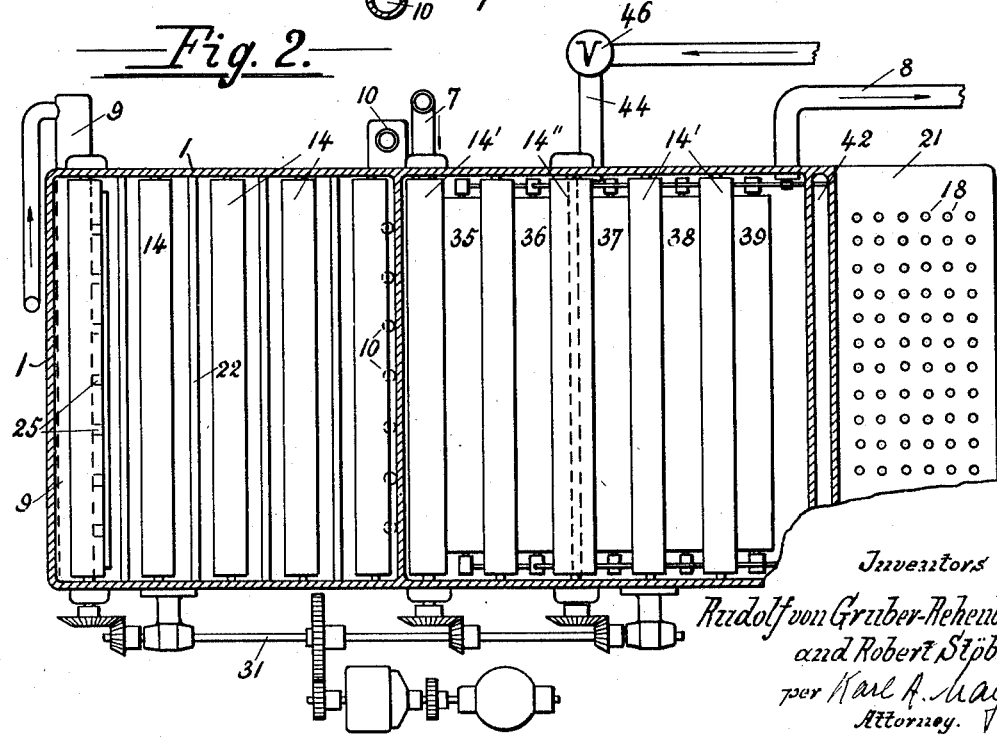

Patented Apr. 26, 1938

2,115,630

UNITED STATES PATENT OFFICE 2,115,630

PROCESS AND APPARATUS FOR TREATING LENGTHS OF MATERIAL

Rudolf von Gruber-Rehenburg and Robert Stöbe, Munich, Germany, assignors to Dr. Alexander Wacker Gesellschaft für Elektrochemische Industrie G. m. b. H., Munich, Germany, a corporation Application November 13, 1935, Serial No. 49,557
In Germany November 20, 1934

12 Claims. (Cl. 91—55)

The present invention relates to an apparatus for treating a length of material with fluid matters and drying such material in continuous operation, particularly to such an apparatus which is of exceedingly compact design and includes an exchange chamber and in which practically no solvent and very little heat is lost and the treating and drying effect is greatly increased.

An object of the present invention is to provide an apparatus for treating a length of material with volatile solvents and drying such material, said apparatus containing a very small volume of gas.

A further object of the present invention resides in the provision of an apparatus for treating a length of material with volatile solvents and drying such material and having all operating mechanisms such as gears, operating and adjusting means for the transport rollers etc. arranged outside of the treating and drying chambers.

Another object of this invention is to provide an apparatus for treating a length of material with volatile solvents and drying such material and comprising at least two chambers for the treatment with volatile solvents, said chambers being interconnected for fluid flow, whereby the solvent flows counter to the direction of the movement of the material.

A further object of this invention is the provision of an apparatus for treating a length of material with volatile solvents and drying such material, said apparatus comprising rollers for conducting and transporting the material to be treated and adapted to be kept in a swinging motion, whereby the treating effect is greatly increased and the time required for effective treatment is reduced.

Another object of the present invention resides in the provision of an apparatus for treating a length of material with volatile solvents and drying such material, said apparatus using a drying gas of comparatively low temperature and having provisions for conducting the gas at great velocity counter to the direction of movement of the material, said provisions being adapted to also heat the gas while it passes through the apparatus.

A further object of this invention is to provide an apparatus for treating a length of material with fluids and drying such material, said apparatus comprising an exchange chamber in which the treated material is moved closely along and counter to the incoming material to be treated, whereby vaporized fluid, which might otherwise leave the apparatus along with the treated material, particularly with the air stream caused by the outgoing material, is held back and carried back into the apparatus by the incoming untreated material and particularly by the air adjacent to said incoming material, said exchange chamber preferably being heated for improving the exchange action so that practically no solvent fumes escape from the apparatus.

Another object of the present invention resides in the provision of an apparatus for treating a length of material with volatile solvents and drying such material, said apparatus comprising means for drying the incoming untreated material, whereby the impregnating effect of the volatile solvents is greatly increased, said means preferably consisting in heating means, and/or exposing the untreated material to a current of air, preferably hot air.

Further and other objects of the present invention will be hereinafter set forth in the accompanying specification and claims and shown in the drawing which, by way of illustration, shows what we now consider to be a preferred embodiment of our invention.

In the drawing:

Fig. 1 is a vertical, longitudinal, sectional view of an apparatus according to the present invention.

Fig. 2 is a horizontal, sectional view of the apparatus shown in Fig. 1 with covers 17 removed and taken along line 2—2 looking in the direction of the arrows.

Like parts are designated by like numerals in both figures of the drawing.

Referring more particularly to the drawing: 1 is the housing of the apparatus; this is divided into three subchambers 4, 5, and 6 by means of partitions 2 and 3. Subchambers 4 and 5 contain the treating fluid and subchamber 6 the means for drying the treated material.

For example, the incoming material 26 may be cleaned in chamber 4 by treating it with trichlorethylene, and in chamber 5 it may be impregnated with rubber dissolved in trichlorethylene; or chambers 4 and 5 may both be used for cleaning the material. In the latter case, the cleaning medium is introduced through conduit 7 into chamber 5 and leaves chamber 4 through conduit 8. Partition 2 permits a flowing over of the treating fluid from chamber 5 into chamber 4. The material to be treated is supported and carried forward by means of rollers 14 in chamber 6 and rollers 14' in chambers 4 and 5. Some of these rollers, for example, 14" are motor driven. It is to be noted that the common drive 31 for the driven rollers is arranged outside of housing 1.

Guide rollers 15 are arranged close to the bottom of chamber 6 and rollers 35, 36, 37, 38, and 39 close to the bottom of chambers 4 and 5. The material runs alternately over an upper and a lower roller. The lower rollers 35, 36, 37, 38, and 39 are moved reciprocatingly and laterally and swing towards and from one another, whereby the soaking and treating effect is greatly improved. A mechanism for effecting such laterally swinging motion is shown in the drawing. Motor 57 drives a crank shaft or disc 32 to which two crossheads 33 and 33' are operatively connected by means of connecting rods 34 and 34'. By means of shafting 40, rollers 36 and 38 are connected to and reciprocatingly moved by crosshead 33', and, by means of shafting 41, rollers 35, 37, and 39 are connected to and reciprocatingly moved by crosshead 33.

The gas or air for drying the fluid treated material enters chamber 6 through conduit 9 which is arranged across the whole chamber 6 and is provided with a plurality of nozzles 25 so that the air or gas is blown equally over the whole width of the material to be dried. The drying gas or air leaves chamber 6 through conduits 10 which are preferably arranged over the whole width of casing 1 so that an equal distribution of the current of gas or air is assured over the whole width of the apparatus.

For recuperation of vaporized treating fluid, conduits 10 are connected with a fluid recovery apparatus which, in the embodiment of my invention as illustrated, is a condenser 50. The condensed vapor leaves this condenser through conduit 51, and the gas or air now free of vapor leaves the condenser through conduit 52 and is carried back by means of blower 53 to the distributing conduit 9. To conduit 51, a three-way valve 54 is connected by means of which the condensate may be carried back into the treating chambers 4 and/or 5 or may be conducted through conduit 55 to some other destination. A fresh supply of treating fluid can be introduced through conduit 56.

In chamber 6, partitions 16 are provided which extend from the bottom of the chamber up to close proximity with the upper material support rollers 14. Partitions 16 may be provided with heating means such as steam or hot water pipes 27. Other partitions 22 extend from the upper part of chamber 6 down to close proximity with the lower material conducting rollers 15. Always just one length of material moves between a partition 16 and a partition 22, and the space between the partitions is so small that the drying air or gas passes at high velocity through this space and along the material to be dried. Furthermore, covers 17 are provided immediately above the upper material guide and support rollers 14 so that dead spaces are eliminated, and the apparatus contains a very small volume of air or gas, and that which is contained passes through at high velocity, whereby the drying effect is augmented. Covers 17 may have concave configuration to better accommodate the rollers 14.

There is just sufficient space left between covers 17 and the top wall of casing 1 to permit passing through of the treated and dried material. This latter then passes through a slot in wall 3 into the uppermost part of chambers 5 and 4 and travels above the material guide and support rollers 14' in these chambers and in close proximity with the upper wall of housing 1. The finished material leaves the apparatus through exchange chamber 12 which is directly connected with casing 1 and has preferably at least one wall, for example, 1' in common with said casing. Exchange chamber 12 is divided into two channels 42 and 43 by means of partition 20 which may be heated by a hot medium passing through channels or pipes 26 connected with partition 20. In the embodiment of the present invention shown in the drawing, the finished material enters the exchange chamber through slot 11, travels around support roller 30 and leaves the exchange chamber through slot 13. The fresh untreated material enters the exchange chamber through slot 13 and travels in a direction counter to the travel direction of the finished material along and in close proximity thereto; it is supported by roller 29 which is arranged adjacent to roller 30. Before entering chamber 12, the untreated material passes over heating means 21 which may be heated by a hot medium passing through conduits 18 or which may be flat and have perforations 19 through which hot air is blown onto the untreated material. The heating means 21 are arranged directly adjacent to the apparatus and the exchange chamber so that no heat is lost.

The apparatus operates as follows:

The material to be treated first travels adjacent to the heating means 21; it is thereby dried and heated. The material then enters channel 42 of exchange chamber 12 through slot opening 13 and travels over guide and support roller 29 into channel 43 of chamber 12. Therefrom it enters chamber 4 through slot opening 11 and travels through said chamber several times downwards and upwards guided by rollers 14' and 37, 38, and 39 and pulled forward by roller 14''. In chamber 4, the material is soaked with the treating fluid, the soaking effect being increased by the swinging motion of rollers 37, 38, and 39. From chamber 4, the material travels into chamber 5 through which it is guided and carried by other rollers 14' and swinging rollers 35 and 36. If the apparatus is used for cleaning the material, the cleaning fluid enters through conduit 7, fills chamber 5 and passes over the upper rim of wall 2 into chamber 4 in counterflow to the material to be treated. The fluid leaves chamber 4 through conduit 8. When the apparatus is used for impregnating only, the impregnating fluid may enter through conduit 7 or 8, and different impregnating fluids may be used in chambers 4 and 5. When the apparatus is used first for cleaning and then for impregnating the material, chamber 4 is used for cleaning, and the cleaning fluid enters through conduit 44 and leaves chamber 4 through conduit 8. Chamber 5 is then used for impregnating, and the impregnating fluid enters through conduit 7. Conduit 44 is provided with valve 46 which is closed when the apparatus is used for cleaning and impregnating only.

From the fluid treating chamber 5, the material travels into and through the drying chamber 6 and therefrom into and through the exchange chamber 12. As already said, the latter is preferably heated, whereby the transmission of vaporized fluid carried along with the finished material to the air or gas traveling along with the incoming untreated material is facilitated, and no treating fluid or vapor thereof passes from chamber 12 into the room where the apparatus is located.

While we believe the above described embodiments of the present invention to be preferred embodiments, we wish it to be understood that we do not desire to be limited to the exact details of process, design, and construction shown and described, for obvious modifications will occur to a person skilled in the art.

We claim:

1. An apparatus for treating a length of material comprising a chamber for treating the material with liquid matter, a chamber for treating the material with gaseous matters, an exchange chamber through which the treated material leaves the apparatus and the untreated material enters the apparatus in close proximity with the treated material, and heating means directly connected with said exchange chamber and said apparatus and adapted to heat the untreated material before it enters said exchange chamber, all three chambers and said heating means being directly interconnected and forming one unit.

2. An apparatus for treating a length of material comprising a chamber for treating the material with liquid matter, a chamber for treating the material with gaseous matters, an exchange chamber through which the treated material leaves the apparatus and the untreated material enters the apparatus in close proximity with the treated material, and heating means directly connected with said exchange chamber and said apparatus and comprising a member having a heated surface over which the untreated material passes for heating the untreated material before it enters said exchange chamber, all three chambers and said heating means being directly interconnected and forming one unit.

3. An apparatus for treating a length of material comprising a liquid treating chamber having at least two adjacent sub-chambers filled with different treating liquids for consecutively treating the material with different liquid matters in each of said sub-chambers, a gas treating chamber for treating the material with gaseous matters, and an exchange chamber through which the treated material leaves the apparatus and the untreated material enters the apparatus in close proximity with the treated material, said chambers all being directly interconnected and forming one unit.

4. An apparatus for continuously treating a length of material comprising a fluid treating chamber for treating the material with fluid matter, support and transport rollers located in the upper part of said chamber for supporting, conducting and moving said material through said chamber, guide rollers located in the lower part of said chamber for guiding said material through said chamber along a predetermined path, said guide rollers being adapted to laterally, reciprocatingly move towards and from one another and to thereby keep the material guided and the adjacent fluid matter in motion for improving contact of said material with said fluid matter.

5. An apparatus for continuously treating a length of material comprising a gas treating chamber for treating the material with gaseous matters, said chamber having an upper closure, support rollers located in the upper part of said chamber and guide rollers located in the lower part of said chamber for supporting and guiding said material along a predetermined path, a ceiling immediately above said support rollers and below said upper closure, said ceiling and upper closure forming a channel for conducting said material therethrough after it has been treated.

6. An apparatus for continuously treating a length of material comprising a fluid treating chamber for treating the material with a fluid matter, an exchange chamber for conducting the treated material out of said apparatus and the untreated material into said apparatus and in close proximity with and parallel to the treated material for the purposes described, said exchange chamber being directly connected with said fluid treating chamber and having at least one wall in common with said fluid treating chamber, which wall is situated parallel to substantially the whole path of the material in said exchange chamber as well as to substantially the whole path of the material in said fluid treating chamber.

7. An apparatus for continuously treating a length of material comprising a fluid treating chamber for treating the material with a fluid matter, an exchange chamber for conducting the treated material out of the apparatus and the untreated material into said apparatus and in close proximity with and parallel to the treated material for the purposes described, a partition in said exchange chamber dividing said chamber into two narrow parallel channels through each of which incoming untreated and outgoing treated material travels in close proximity with and parallel to one another, and heating means connected with said partition for internally heating said exchange chamber.

8. The process of treating a length of material in continuous operation comprising passing the material through an exchange chamber, immediately thereafter passing it through a treating chamber in which the material is treated with a fluid, immediately thereafter passing the material through a drying chamber in which the material is treated with a heated gas, and immediately thereafter passing it through a portion of the fluid treating chamber in which it is not directly exposed to the fluid, and then again through the exchange chamber and in close proximity with and parallel to the incoming portions of the material which also pass through the exchange chamber for reducing losses of vaporized treating fluid.

9. The process of treating a length of material in continuous operation comprising first drying the material, then passing the material through an exchange chamber, then passing it through a treating chamber in which the material is treated with a fluid, then passing the material through a drying chamber in which the material is treated with a gas, and then passing it again through the exchange chamber and in close proximity with and parallel to the incoming portions of the material which also pass through the exchange chamber for reducing losses of vaporized treating fluid.

10. The process of impregnating a length of material in continuous operation comprising successively passing the material through an exchange chamber, then through a plurality of chambers in which the material is treated with an impregnating fluid, then through a drying chamber in which it is treated with a drying gas, and then passing the material again through the exchange chamber and in close proximity to incoming portions of material for reducing losses of vaporized treating fluid.

11. The process of impregnating a length of material in continuous operation comprising successively passing the material first through an exchange chamber, then immediately, consecutively through a plurality of chambers in which the material is treated with different impregnating fluids, immediately thereafter through a drying chamber in which it is treated with a drying gas, and immediately thereafter passing the material again through the exchange chamber and in close proximity to the incoming portions of material for reducing losses of vaporized treating fluid.

12. The process of impregnating a length of material in continuous operation comprising successively passing the material first through material drying means, immediately thereafter through an exchange chamber, immediately thereafter through an impregnating chamber in which the material is treated with an impregnating fluid, immediately thereafter through a drying chamber in which the material is treated with a drying gas, and immediately thereafter passing the material again through the exchange chamber and in close proximity to incoming portions of the material for reducing losses of vaporized treating fluid.

RUDOLF v. GRUBER-REHENBURG.
ROBERT STÖBE.